(12) United States Patent
Abdo et al.

(10) Patent No.: US 8,971,615 B2
(45) Date of Patent: *Mar. 3, 2015

(54) IMAGE TYPE CLASSIFIER FOR IMPROVED REMOTE PRESENTATION SESSION COMPRESSION

(71) Applicant: Microsoft Corporation, Redmond, WA (US)

(72) Inventors: Nadim Y. Abdo, Redmond, WA (US); Tong L. Wynn, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/273,362

(22) Filed: May 8, 2014

(65) Prior Publication Data

US 2014/0241622 A1     Aug. 28, 2014

Related U.S. Application Data

(63) Continuation of application No. 13/158,228, filed on Jun. 10, 2011, now Pat. No. 8,737,724.

(51) Int. Cl.
*G06K 9/00* (2006.01)
*G06K 9/66* (2006.01)
*G06K 9/32* (2006.01)
*G06K 9/62* (2006.01)

(52) U.S. Cl.
CPC .............. *G06K 9/66* (2013.01); *G06K 9/00456* (2013.01); *G06K 9/325* (2013.01); *G06K 9/6262* (2013.01); *G06K 9/6256* (2013.01)
USPC .......................................... 382/159; 382/232

(58) Field of Classification Search
USPC ................................................ 382/159, 232
See application file for complete search history.

(56) References Cited

U.S. PATENT DOCUMENTS

| | | | |
|---|---|---|---|
| 5,949,555 | A | 9/1999 | Sakai et al. |
| 5,966,467 | A | 10/1999 | Davies |
| 6,873,343 | B2 | 3/2005 | Chui |
| 6,961,462 | B2 | 11/2005 | Watanabe et al. |
| 6,980,693 | B2 | 12/2005 | Horie |
| 7,171,444 | B2 | 1/2007 | Deshpande |
| 7,218,784 | B1 | 5/2007 | Zeck et al. |
| 7,844,848 | B1 | 11/2010 | Hobbs |
| 8,351,691 | B2 | 1/2013 | Chen et al. |
| 8,472,461 | B2 * | 6/2013 | Keon ............................ 370/431 |
| 8,737,724 | B2 * | 5/2014 | Abdo et al. ................... 382/159 |

(Continued)

OTHER PUBLICATIONS

Fagg et al., "RDP Classification Algorithm for Selecting Optimal Image Encoder Based on Image Content", Nov. 30, 2009, 8 pages.

(Continued)

*Primary Examiner* — Gregory M Desire
(74) *Attorney, Agent, or Firm* — Kate Drakos; Micky Minhas

(57) ABSTRACT

An invention is disclosed for classifying a graphic—e.g. as text or non-text. In embodiments, machine learning is used to generate a solution for classifying graphics of a graphic based on providing the machine learning system a plurality of graphics that are already classified. The way to determine a classification is then used by a remote presentation session server to classify tiles of frames to be transmitted to a client in a remote presentation session. The server encodes the tiles based on their classifications and transmits the encoded tiles to the client.

20 Claims, 18 Drawing Sheets

(56) References Cited

U.S. PATENT DOCUMENTS

| | | |
|---|---|---|
| 2006/0115169 A1 | 6/2006 | Ohk |
| 2010/0208951 A1 | 8/2010 | Williams et al. |
| 2010/0215280 A1 | 8/2010 | Abdo et al. |
| 2010/0226548 A1 | 9/2010 | Abdo et al. |
| 2011/0164580 A1 | 7/2011 | Keon |
| 2011/0164581 A1 | 7/2011 | Keon |
| 2012/0314938 A1 | 12/2012 | Abdo et al. |
| 2014/0241622 A1* | 8/2014 | Abdo et al. .............. 382/159 |

OTHER PUBLICATIONS

"Windows 7 with RDP7 : Best OS for VDI—Remote Desktop Services (Terminal Services) Team Blog", http://blogs.msdn.com/b/rds/archive/2009/11/02/windows-7-with-rdp7-best-o-s-for-vdi.aspx, accessed Mar. 16, 2011, 3 pages.

Cerra et al., "Image Classification Using Data Compression Based Techniques", Information Extraction from High Resolution SAR images II, 2008, 2 pages.

Okun et al., "A Survey of Texture-Based Methods for Document Layout Analysis", World Scientific, Nov. 25, 1999, 1-13.

* cited by examiner

IMAGE TYPE CLASSIFIER FOR IMPROVED REMOTE PRESENTATION SESSION COMPRESSION

CROSS REFERENCE TO RELATED APPLICATIONS

This application is a Continuation of U.S. patent application Ser. No. 13/158,228, filed on Jun. 10, 2011, titled "Image Type Classifier For Improved Remote Presentation Session Compression," the contents of which are incorporated by reference.

BACKGROUND

In a remote presentation session, a client computer and a server computer communicate across a communications network. The client sends the server locally-received input, such as mouse cursor movements and keyboard presses. In turn, the server receives this input and performs processing associated with it, such as executing an application in a user session. When the server performs processing that results in output, such as graphical output or sound, the server sends this output to the client for presentation. In this manner, applications appear to a user of the client to execute locally on the client when, they in fact, execute on the server.

The amount of graphical output generated by a remote presentation server (frequently referred to as a plurality of "frames") often taxes or exceeds the bandwidth available between the server and the client. In view of this, it is common for the server to encode the graphical output in a way that compresses it before sending the encoded graphical output to the client. There are many problems with prior techniques for compressing graphical output in a remote presentation session, some of which are well known.

SUMMARY

A problem with previous techniques for encoding frames in remote presentation sessions is the lack of a way to efficiently determine a classification of parts of the frame (herein referred to as graphics, or tiles). An advantage to determining a classification for a graphic is that differently classified tiles may be encoded differently, to the benefit of user experience. For instance, people are generally more sensitive of compression artifacts in text than in images. Therefore, it may benefit user experience to encode text at a higher fidelity (or with a codec that is superior at encoding text than images) than images.

Embodiments of the invention efficiently classify graphics of frames to be transmitted in a remote presentation session. In embodiments, the invention takes a first plurality of graphics (the "training" set) that have been classified and uses machine learning to determine a solution for classifying graphics. The invention then takes a second plurality of graphics (the "test" set) that have been classified, and evaluates them with the solution. Where the solution correctly identifies the classification of both the training and test sets above a threshold amount of the time, the solution is deemed satisfactory and may be used in a remote presentation session server.

In embodiments of the invention, the remote presentation session server generates frames to be transmitted to a client in a remote presentation session. The server divides a frame into a plurality of graphics/tiles and classifies each graphic of the frame. The server then determines how to encode the frame based on these classifications (such as by encoding the graphics that are text one way, and the graphics that are non-text another way), encodes the frame according to the determination, and transmits the encoded frame to the client via the remote presentation session.

DETAILED DESCRIPTION OF ILLUSTRATIVE EMBODIMENTS

Figure 1:
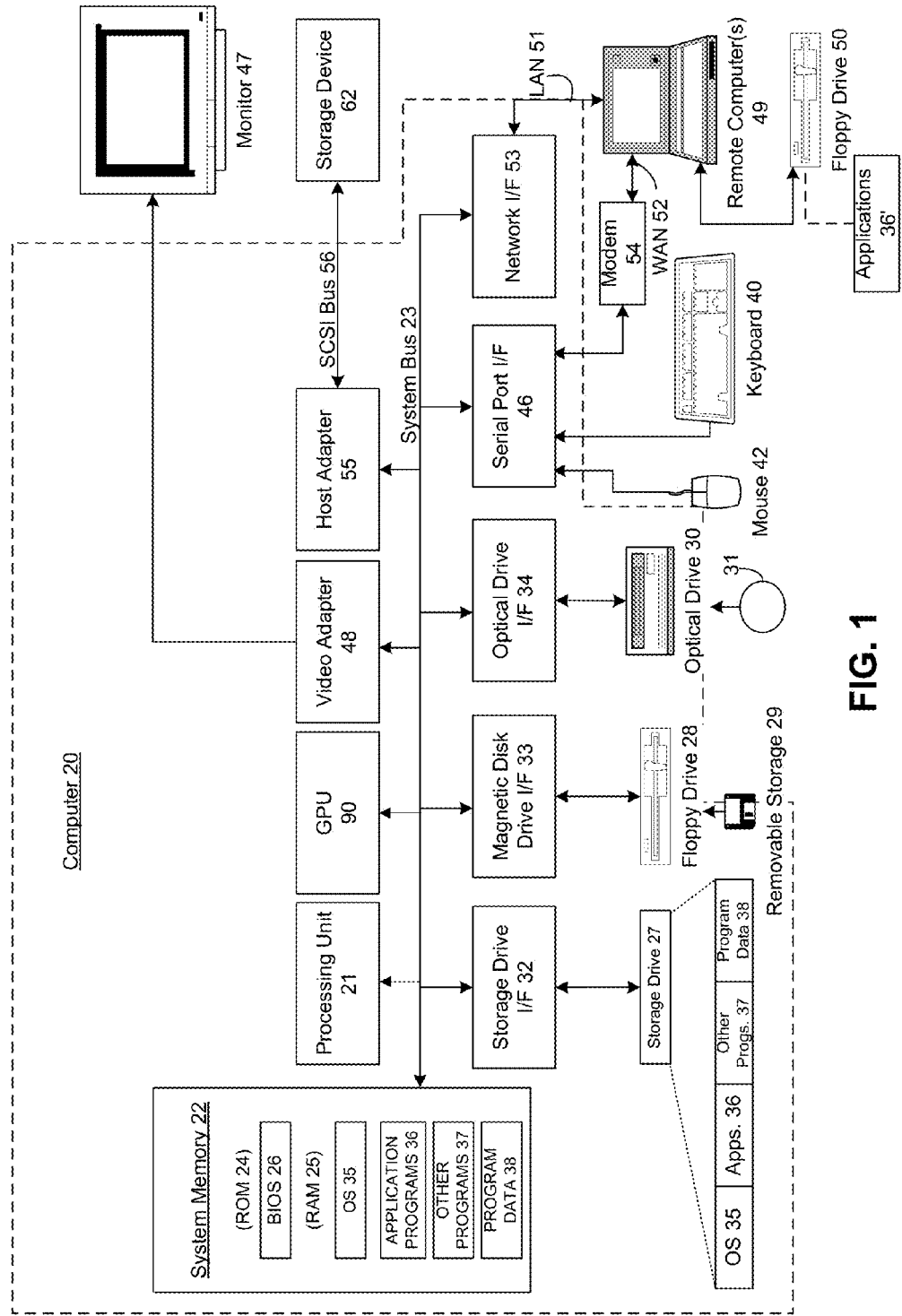
FIG. 1 depicts an example general purpose computing environment in which embodiments of the invention may be implemented.

Embodiments of the invention may execute on one or more computer systems. FIG. 1 and the following discussion are intended to provide a brief general description of a suitable computing environment in which embodiments of the invention may be implemented.

FIG. 1 depicts an example general purpose computing system. The general purpose computing system may include a conventional computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Computer 20 may also comprise graphics processing unit (GPU) 90. GPU 90 is a specialized microprocessor optimized to manipulate computer graphics. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22, and a system bus 23 that communicative couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21. Additionally, devices connected to system bus 23, such as storage drive I/F 32 or magnetic disk drive I/F 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer-readable storage media provide non-volatile storage of computer readable instructions, data structures, program modules and other data for the computer 20.

Although the example environment described herein employs a hard disk, a removable magnetic disk 29 and a removable optical disk 31, it should be appreciated by those skilled in the art that other types of computer readable media which can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure. Computer 20 may also comprise a host adapter 55 that connects to a storage device 62 via a small computer system interface (SCSI) bus 56.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

Figure 2:
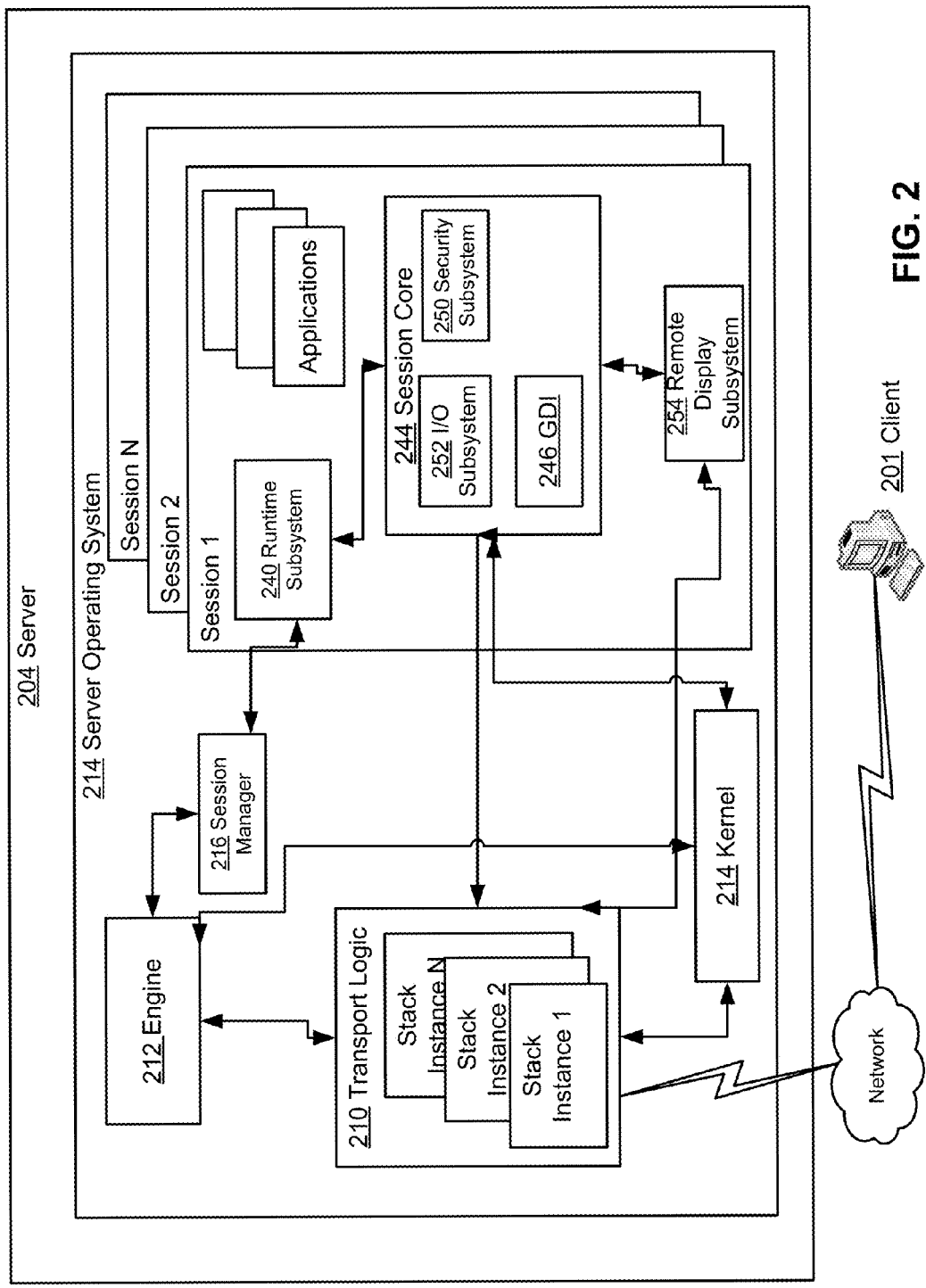
FIG. 2 depicts an example remote presentation session server in which embodiments of the invention may be implemented.

FIG. 2 generally illustrates an example environment wherein aspects of the present invention can be implemented. For instance, the server 204 may implement the operational procedures of FIGS. 13-18. One skilled in the art can appreciate that the example elements depicted by FIG. 2 are illustrated to provide an operational framework for describing the present invention. Accordingly, in some embodiments the physical layout of each environment may be different depending on different implementation schemes. Thus the example operational framework is to be treated as illustrative only and in no way limit the scope of the claims.

Depicted in FIG. 2 is server 204, which may include circuitry configured to effectuate a remote presentation session server, or in other embodiments the server 204 can include circuitry configured to support remote desktop connections. In the depicted example, the server 204 can be configured to generate one or more sessions for connecting clients such as sessions 1 through N (where N is an integer greater than 2). Briefly, a session in example embodiments of the present invention can generally include an operational environment that is effectuated by a plurality of subsystems, e.g., software code, that are configured to interact with a kernel 214 of server 204. For example, a session can include a process that instantiates a user interface such as a desktop window, the subsystems that track mouse movement within the window, the subsystems that translate a mouse click on an icon into commands that effectuate an instance of a program, etc. A session can be generated by the server 204 on a user by user basis by the server 204 when, for example, the server 204 receives a connection request over a network connection from a client 201. Generally, a connection request can first be handled by the transport logic 210 that can, for example, be effectuated by circuitry of the server 204. The transport logic 210 can in some embodiments include a network adaptor; firmware, and software that can be configured to receive connection messages and forward them to the engine 212. As illustrated by FIG. 2, the transport logic 210 can in some embodiments include protocol stack instances for each session. Generally, each protocol stack instance can be configured to route user interface output to a client and route user input received from the client to the session core 244 associated with its session.

Continuing with the general description of FIG. 2, the engine 212 in some example embodiments of the present invention can be configured to process requests for sessions; determine the functionality for each session; generate sessions by allocating a set of physical resources for the session; and instantiating a protocol stack instance for the session. In some embodiments the engine 212 can be effectuated by specialized circuitry components that can implement some of the above mentioned operational procedures. For example, the circuitry in some example embodiments can include memory and a processor that is configured to execute code that effectuates the engine 212. As depicted by FIG. 2, in some instances the engine 212 can receive connection requests and determine that, for example, a license is available and a session can be generated for the request. In the situation where the server 204 is a remote computer that includes remote desktop capabilities, the engine 212 can be configured to generate a session in response to a connection request without checking for a license. As illustrated by FIG. 2, a session manager 216 can be configured to receive a message from an engine 212 and in response to the message the session manager 216 can add a session identifier to a table; assign memory to the session identifier; and generate system environment variables and instances of subsystem processes in memory assigned to the session identifier.

As illustrated by FIG. 2, the session manager 216 can instantiate environment subsystems such as a runtime subsystem 240 that can include a kernel mode part such as the session core 244. For example, the environment subsystems in an embodiment are configured to expose some subset of services to application programs and provide an access point to the kernel of the operating system 214. In example embodiments the runtime subsystem 240 can control the execution of processes and threads and the session core 244 can send requests to the executive of the kernel 214 to allocate memory for the threads and schedule time for them to be executed. In an embodiment the session core 244 can include a graphics display interface 246 (GDI), a security subsystem 250, and an input subsystem 252. The input subsystem 252 can in these embodiments be configured to receive user input from a client 201 via the protocol stack instance associated with the session and transmit the input to the session core 244 for the appropriate session. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 244 and the input subsystem 252 can be configured to determine that an icon is located at the coordinates associated with the double-click. The input subsystem 252 can then be configured to send a notification to the runtime subsystem 240 that can execute a process for the application associated with the icon.

In addition to receiving input from a client 201, draw commands can be received from applications and/or a desktop and be processed by the GDI 246. The GDI 246 in general can include a process that can generate graphical object draw commands. The GDI 246 in this example embodiment can be configured to pass its output to the remote display subsystem 254 where the commands are formatted for the display driver that is attached to the session. In certain example embodiments one or more physical displays can be attached to the server 204, e.g., in a remote desktop situation. In these example embodiments the remote display subsystem 254 can be configured to mirror the draw commands that are rendered by the display driver(s) of the remote computer system and transmit the mirrored information to the client 201 via a stack instance associated with the session. In another example embodiment, where the server 204 is a remote presentation session server, the remote display subsystem 254 can be configured to include virtual display driver(s) that may not be associated with displays physically attacked to the server 204, e.g., the server 204 could be running headless. The remote display subsystem 254 in this embodiment can be configured to receive draw commands for one or more virtual displays and transmit them to the client 201 via a stack instance associated with the session. In an embodiment of the present invention, the remote display subsystem 254 can be configured to determine the display resolution for each display driver, e.g., determine the display resolution of the virtual display driver(s) associated with virtual displays or the display resolution of the display drivers associated with physical displays; and route the packets to the client 201 via the associated protocol stack instance.

In some example embodiments the session manager 216 can additionally instantiate an instance of a logon process associated with the session identifier of the session that can be configured to handle logon and logoff for the session. In these example embodiments drawing commands indicative of the graphical user interface associated with the logon process can be transmitted to the client 201 where a user of the client 201 can input an account identifier, e.g., a username/password combination, a smart card identifier, and/or biometric information into a logon screen. The information can be transmitted to server 204 and routed to the engine 212 and the security subsystem 250 of the session core 244. For example, in certain example embodiments the engine 212 can be configured to determine whether the user account is associated with a license; and the security subsystem 250 can be configured to generate a security token for the session.

Figure 3:
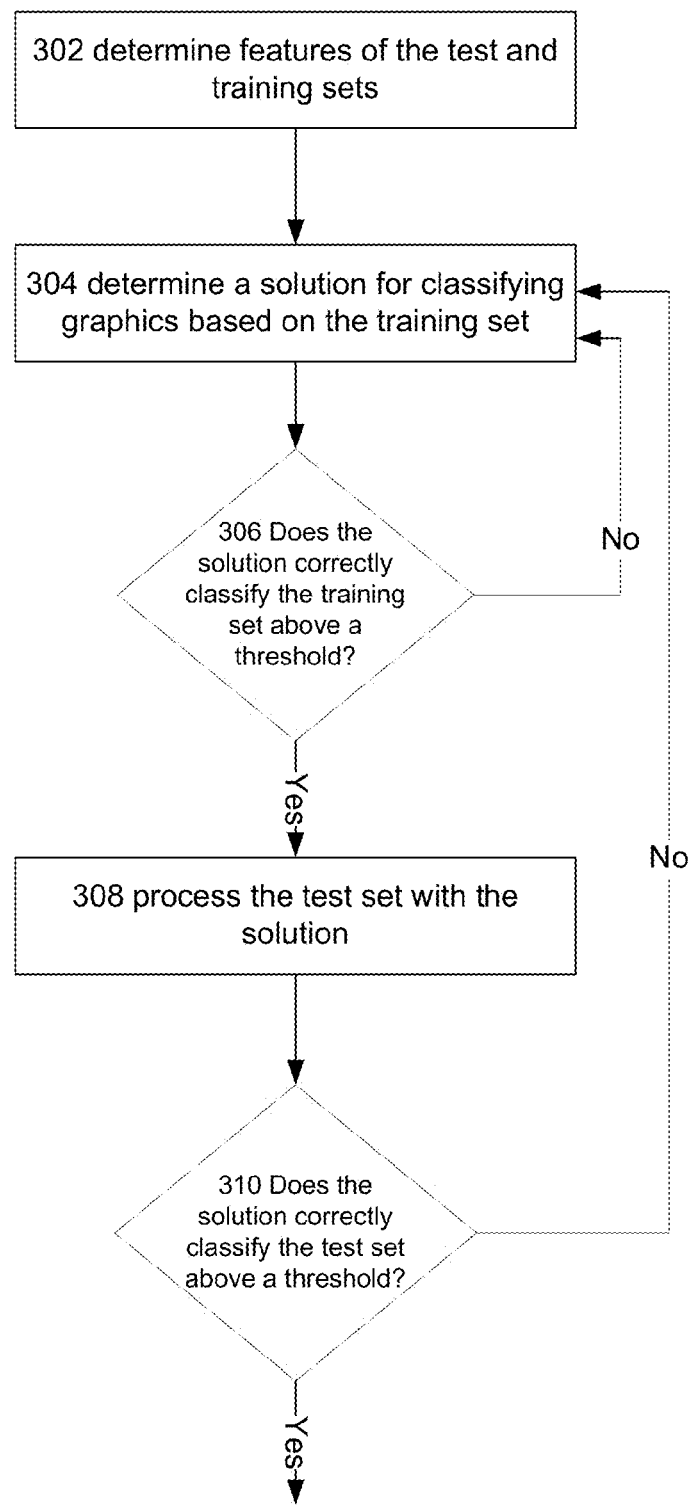
FIG. 3 depicts an example process flow for determining a solution of a frame based on a feature of a tile that may be implemented by embodiments of the invention.

FIG. 3 depicts an example process flow for determining a solution of a frame based on a feature of a tile that may be implemented by embodiments of the invention. In embodiments, the process flow of FIG. 3 may be implemented in server 204 of FIG. 2, or computer 20 of FIG. 1. Embodiments of the invention take tiles that a frame has been subdivided into, the tiles having an indication of a classification, and determine one or more features of each tile. As used herein, a classification for a tile comprises a way to categorize a tile that may be used to encode the tile. For instance, a tile may be classified as text, solid fill, or image (while a frame itself may be an image, not all of it may be used to represent images such as photographs or drawings). In embodiments, tiles classified as images may be encoded with a progressive encoding scheme, whereas it may be considered preferable to encode tiles classified as text with a non-progressive encoding scheme.

A tile may also be classified as a synthetic image or a natural image. A synthetic image may comprise a tile that contains an image that was generated by a computer, or a natural image that has been sufficiently manipulated by a computer (such as through applying filters or transforms to it). A natural image may comprise a tile that contains an image that was originally captured from the physical world—such as a photograph of a building or a tree. A tile may also be classified by which compressor or encoder is suitable to process it. For instance, a particular tile may be more greatly compressed for a given fidelity using a first compressor (or compression technique) rather than a second compressor. In this case, the tile may be classified as being suitable for the first compressor.

As used herein, a feature of a tile may comprise a numerical representation that expresses a quality that the pixels in the tile have. For instance, a feature of a tile may be the difference between the highest red value of any pixel in a tile and the lowest red value of any pixel in the tile (where the pixels are expressed in RGB—red, green, blue—color space). Features of tiles are described in more detail with respect to FIGS. 4-11.

Process 302 depicts determining a feature of each tile of two groups of tiles—a "training set" of tiles, and a "test set" of tiles. Process 302 may comprise, for each tile in those two sets of tiles, determining a feature as depicted in one of FIGS. 4-11, and determining the same feature for each tile. In embodiments, a plurality of features may be determined for each tile.

Process 304 depicts determining a solution or function based on the training set. As used herein, "the solution" does not mean that there is only one possible solution. Rather, the use of "the solution" refers to a particular solution that has been determined, while there may be other solutions that also meet the criteria described herein. The training set comprises a plurality of tiles (with a feature identified for each tile), and a classification associated with the tile. In other words, the training set comprises a plurality of tiles that may be classified, as well as what that classification should be—the input and the corresponding output to logic that classifies tiles ("the solution").

Determining the function may be implemented via machine learning—by providing a computer with a set of input data (the feature of the tiles) and output data (the classification of the tiles), such that the computer will determine a function that correctly identifies the classification based on the feature above a threshold amount of the time. This function may then be used to classify new tiles, for which there is no associated pre-determined classification. Alternatively, machine learning may be considered to involve a computer program or device that learns from experience E with respect to some class of tasks T and performance measure P, if its performance at tasks in T, as measured by P, improves with experience E.

The machine learning process may further be used to tune the function. For instance, the training process for the function may be data driven, where performance measurements are taken on new graphics data processed by the function. Additionally, the codecs used to encode classified graphics may be updated or changed to further improve performance of embodiments of the invention.

Process 306 depicts determining whether the function identified in process 304 is above a threshold when applied to a first set of tiles—the training set. For instance, it may be determined that a function is acceptable even though it does not correctly classify tiles 100% of the time. It may be determined that a function is acceptable where it correctly classifies tiles above a threshold, such as with 90% success. In process 306, it is determined whether the function identified in process 304 is above this threshold. Where the function is above this threshold, the process flow moves to operation 308. Where the function is not above this threshold, the process flow returns to operation 304 to determine another function.

Process 308 depicts determining whether the function identified in process 304 is above a threshold when applied to a second set of tiles—the test set. The threshold of process 308 may differ from the threshold of process 306 (for instance, respective thresholds of 95% and 90% success), or they may be the same threshold (for instance, a threshold of 90%). Two separate sets of tiles may be used to increase the quality of the function. The function is developed using one set of tiles—the training set—and then tested using a wholly different set of tiles (though, there may be embodiments where some tiles are repeated between the two sets). In using two separate sets of tiles (one of which is not used to develop the function), the likelihood of "overfitting" the function is reduced. Overfitting is generally an excessively complex function that accounts for errors or noise in the data sets (e.g. tiles that have been mis-classified before being provided to process 304).

Where in process 308 it is determined that the function as applied to the test set of tiles is successful above the threshold, the function may be considered acceptable and stored for use in classifying tiles in a remote presentation session. Where it is determined that the function as applied to the test set of tiles is not above the threshold, the process flow may return to process 304, where a new function may be determined.

FIGS. 4-10 depict determining a feature based on a histogram of the pixels in a tile. As depicted in the embodiments of FIGS. 4-10, a tile is 64×64 pixels, for a total of 4,096 pixels, and has values that may range from 0 to 255, inclusive (i.e. 8 bits in binary). For instance, where the pixel is expressed in RGB format, each pixel may be expressed in 24 bits, where each of the R, G, and B values is expressed using 8 bits. In these embodiments, a histogram that looks at the values of each pixel's R, G, or B value comprises 256 possible intervals (0 to 255, inclusive), with a frequency that ranges from 0 to 4,096, inclusive (the total number of pixels in a 64×64 pixel tile). Additionally, the sum of the values of all intervals in the histogram is 4,096 (again, equal to the total number of pixels).

Figure 4:
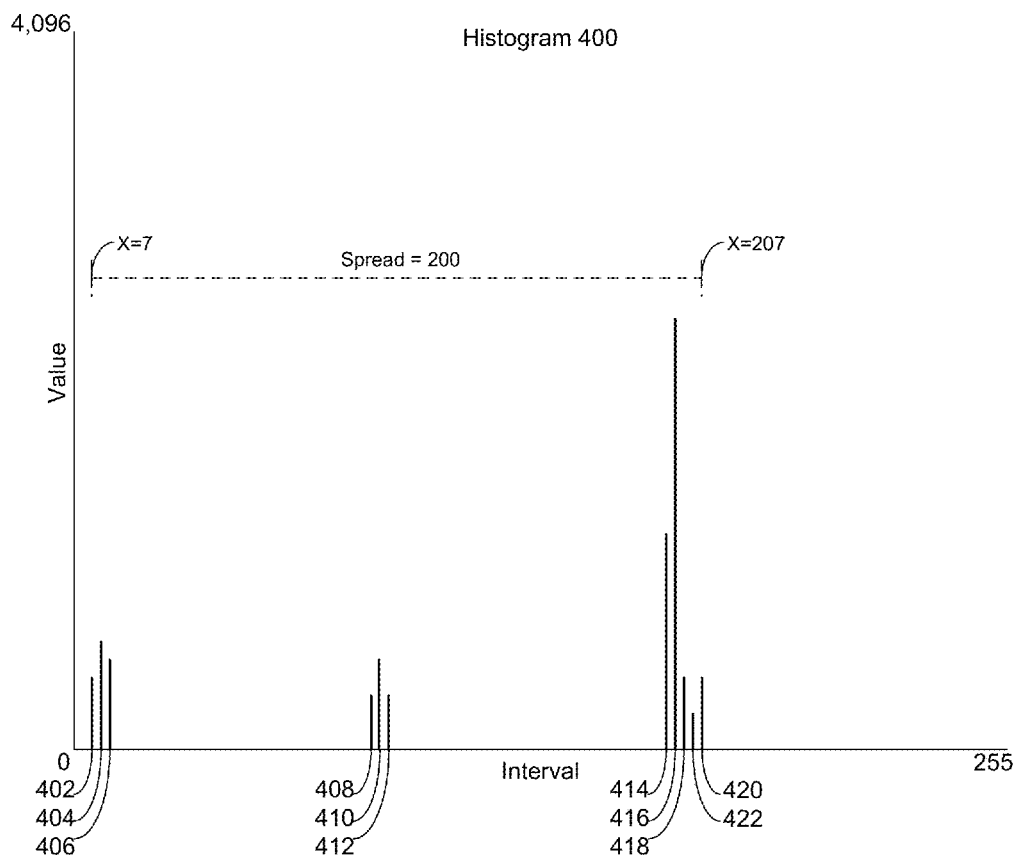
FIG. 4 depicts determining a feature based on an example histogram showing the spread of a color of a tile of a frame.

FIG. 4 depicts determining a feature based on an example histogram showing the spread of a color of a tile of a frame. Determining a feature as depicted in FIG. 4 may be implemented in process 302 of FIG. 3. As depicted for histogram 400, 11 of the 256 possible intervals have a non-zero frequency—intervals 402-422. This histogram may be used to represent the distribution of values for one color of a RGB value—e.g. the distribution of red values. In embodiments, a particular feature may be taken for each color of the RGB value—e.g. a spread of the red values of a tile, the spread of the green values of a tile, and the spread of the blue values of a tile.

As depicted, the spread of the red values of the tile in question is 200. The lowest non-zero interval is 7 (interval 402) and the highest non-zero interval is 207 (interval 422). Although there are intervals with a value of zero between interval 402 and 422 (e.g. those intervals between intervals 406 and 408, or 412 and 414), as used herein, the spread of a color of a tile is considered to be the difference between the least non-zero interval and the highest non-zero interval, regardless or any intervening intervals with a value of zero.

Figure 5:
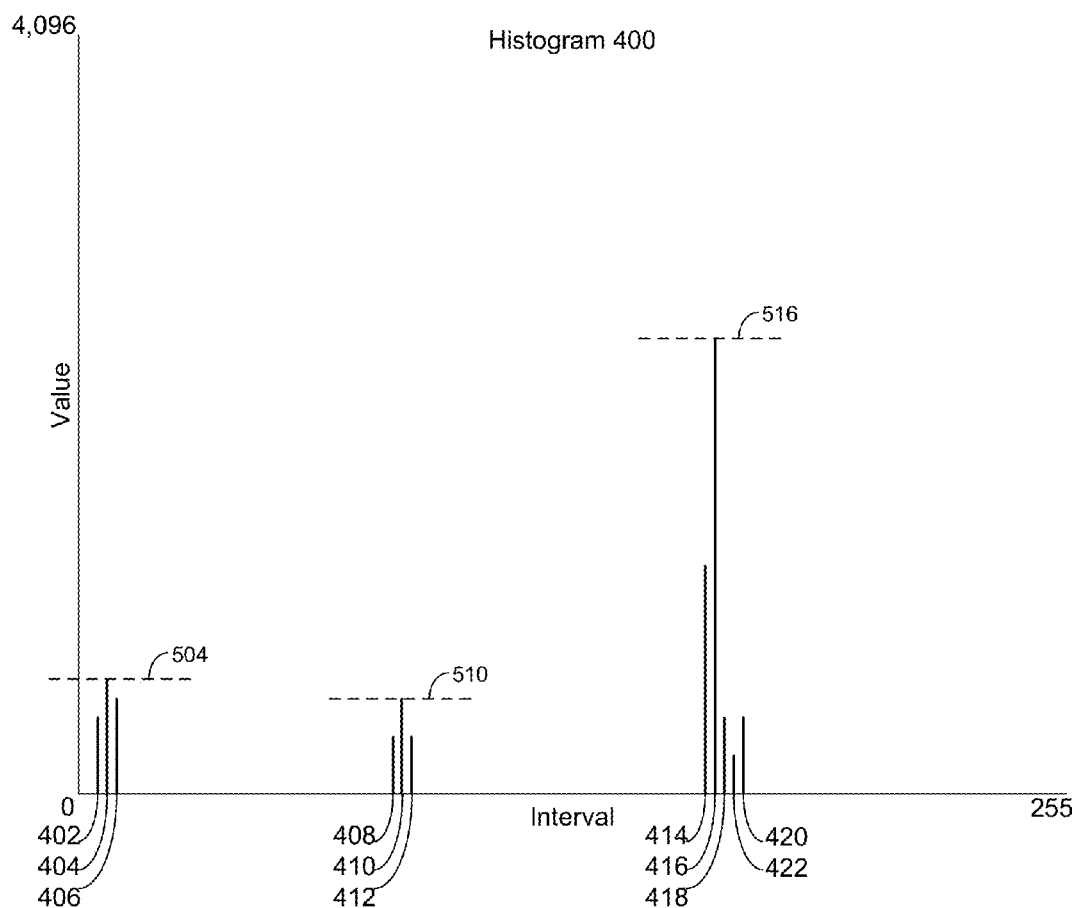
FIG. 5 depicts determining a feature based on an example histogram showing the number of peaks of a color of a tile.

FIG. 5 depicts determining a feature based on an example histogram showing the number of peaks of a color of a tile. Determining a feature as depicted in FIG. 5 may be implemented in process 302 of FIG. 3. A peak may be defined as an interval that has a value not less than the value of the interval immediately above or below it. In embodiments, the lowest and highest intervals may not be eligible to be considered peaks, because they lack an interval below and an interval above, respectively. In embodiments where two adjoining intervals have the same value, the two intervals may be considered a maximum of one peak. In embodiments, even though a particular interval has a value that is not less than either of its neighbors, it may not be considered a peak unless its value is also above a threshold (such as a percentage of the value of the highest peak in the histogram).

As depicted in FIG. 5, there are three peaks in histogram 400—peak 504, peak 510, and peak 516. As depicted, peak 504 and peak 510 are considered peaks even though their value is less than that of peak 516, and even of interval 414, which is itself not a peak. Peak 504 and peak 510 are considered peaks because their value is greater than that of the intervals immediately neighboring them. That is, peak 504 is considered a peak because its value is greater than that of either interval 402 or interval 406, and peak 510 is considered a peak because its value is greater than that of either interval 408 or 412.

Figure 6:
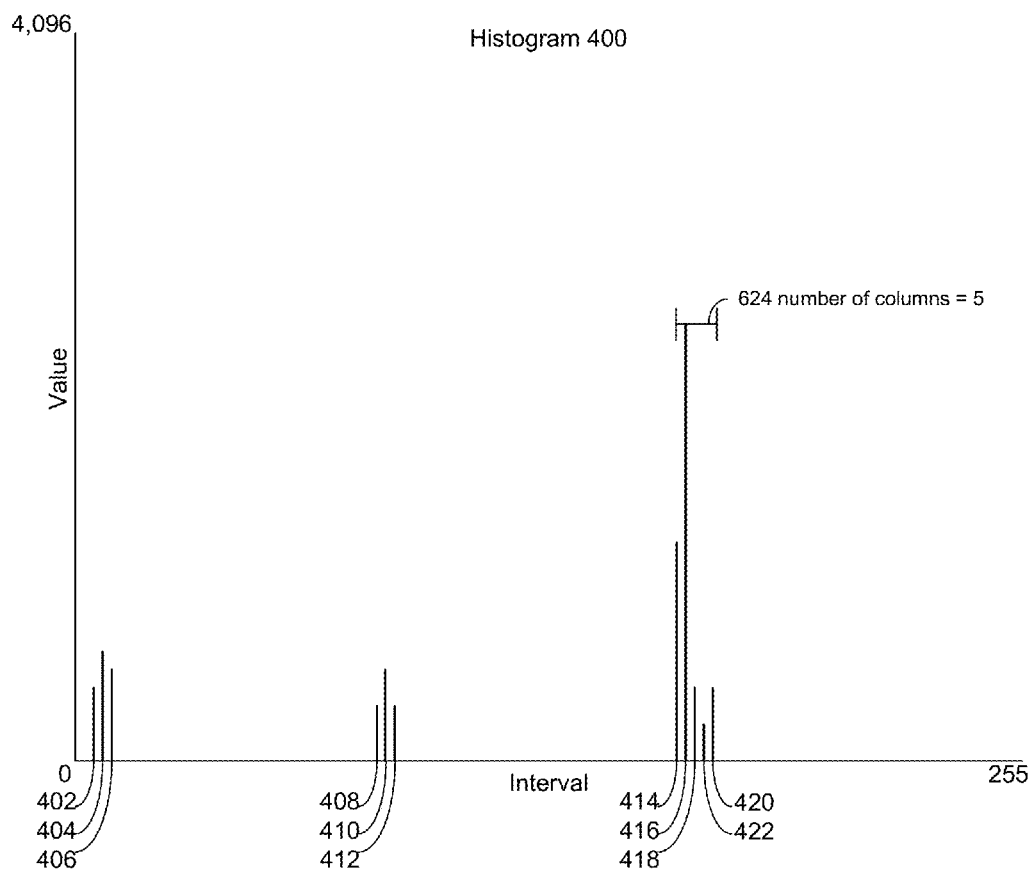
FIG. 6 depicts determining a feature based on an example histogram showing the number of columns in the peak of a color of a tile.

FIG. 6 depicts determining a feature based on an example histogram showing the number of columns in the peak of a color of a tile. Determining a feature as depicted in FIG. 6 may be implemented in process 302 of FIG. 3. A number of columns in a peak may be considered to be the total number of non-zero-valued intervals adjoining the peak interval of all intervals, and including the peak interval. Here, the peak interval among all intervals is interval 416. Adjoining peak 416 without an intervening zero-value interval, are interval 414, interval 418, interval 420, and interval 422. The total number of these intervals, including the peak interval 416, is five. Therefore the number of columns in the peak 624 of histogram 400 is five.

Figure 7:
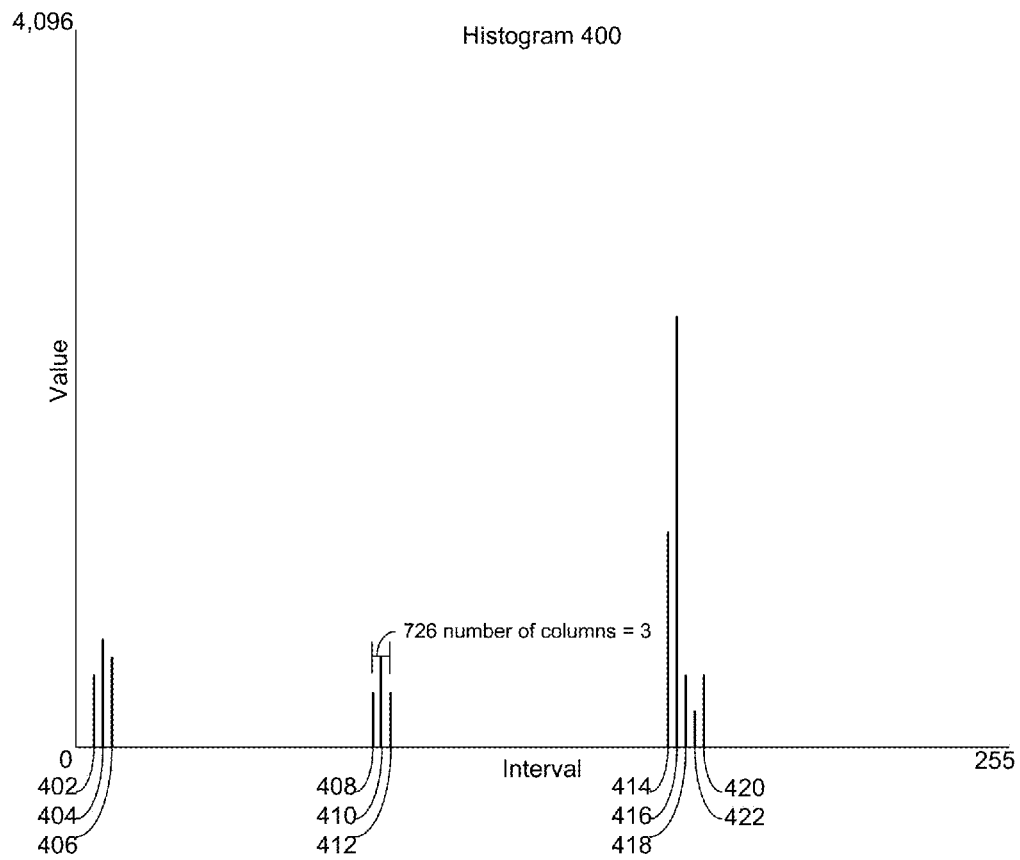
FIG. 7 depicts determining a feature based on an example histogram showing the number of columns in the second peak of a color of a tile.

FIG. 7 depicts determining a feature based on an example histogram showing the number of columns in the second peak of a color of a tile. Determining a feature as depicted in FIG. 7 may be implemented in process 302 of FIG. 3. Determining the number of columns in the second peak of histogram 400 may be performed in a manner similar to determining the number of columns in the peak of histogram 400, as depicted in FIG. 6. The second column may be considered to be the interval with the greatest value that is not a part of the number of columns in the peak. As depicted, intervals 414-422 are part of the peak column, and thus, ineligible to be considered the second peak. Excluding those intervals, the interval with the greatest value is interval 404, so interval 404 may be considered to be the second peak. Interval 404 is neighbored by non-zero-value intervals 402 and 406, for a total of three columns in the second peak 726 of histogram 404.

Figure 8:
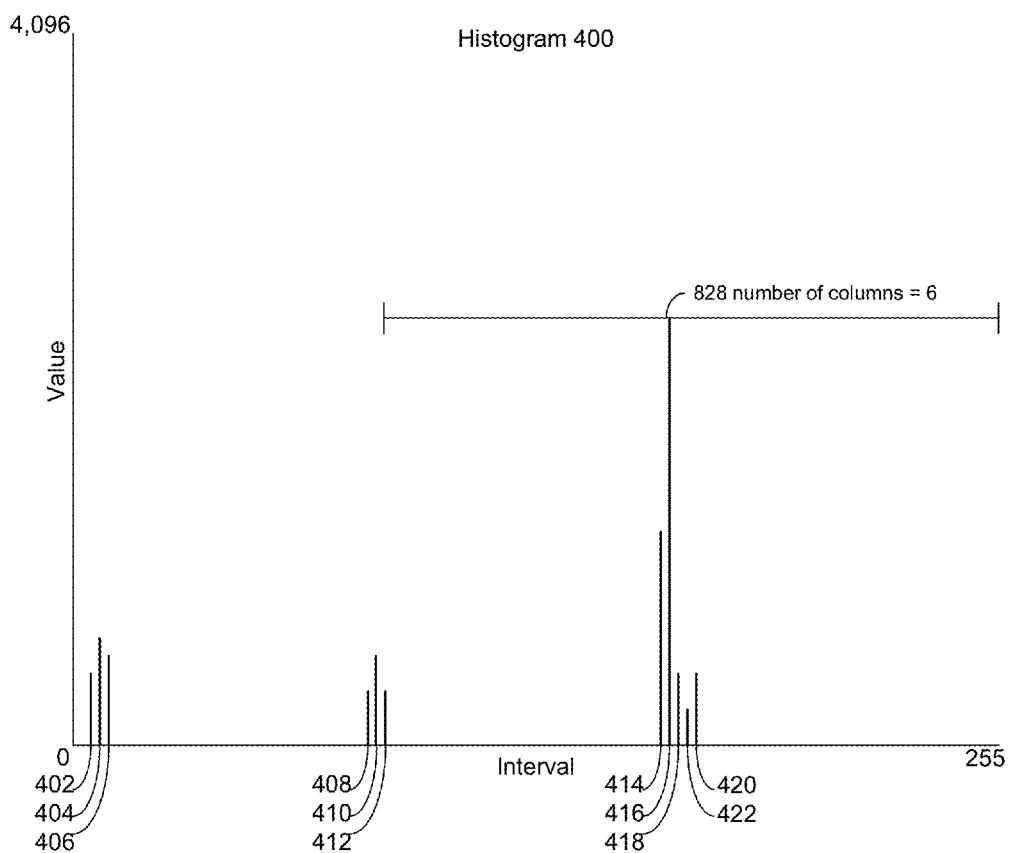
FIG. 8 depicts determining a feature based on an example histogram showing the number of columns in the peak cluster of a color of a tile.

FIG. 8 depicts determining a feature based on an example histogram showing the number of columns in the peak cluster of a color of a tile. Determining a feature as depicted in FIG. 8 may be implemented in process 302 of FIG. 3. A peak cluster may be considered to be all intervals within a given distance from the peak interval. A column within the peak cluster then may be considered to be an interval with a non-zero value. As depicted, the peak cluster 828 of histogram 400 encompasses all non-zero-valued intervals from interval 412 through interval 422, for a number of columns in the peak cluster 828 being six.

Figure 9:
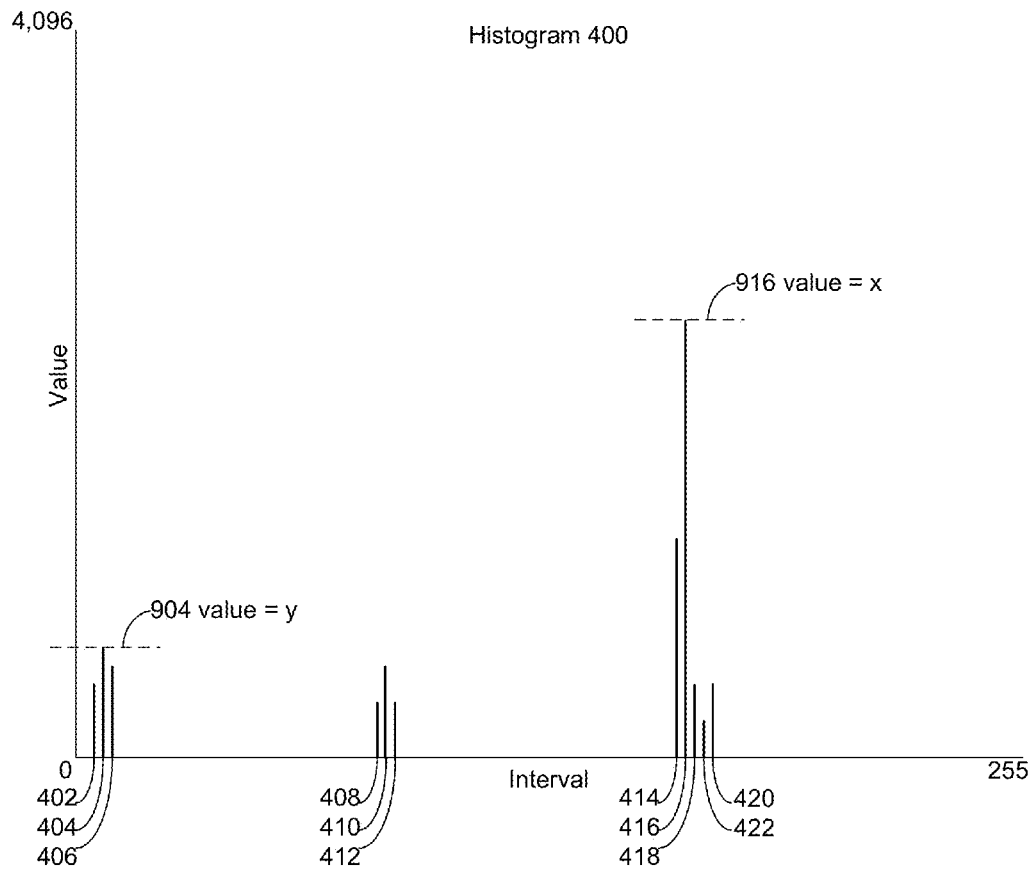
FIG. 9 depicts determining a feature based on an example histogram showing the peak square sum of a color of a tile.

FIG. 9 depicts determining a feature based on an example histogram showing the peak square sum of a color of a tile. Determining a feature as depicted in FIG. 9 may be implemented in process 302 of FIG. 3. The peak sum square may be considered to be the square of the value of the peak summed with the square of the value of the second peak. As depicted, the peak is interval 416, which has a value 916 of x, and the second peak is interval 410, which has a value 904 of y. Thus, as depicted, the peak square sum of histogram 400 may be considered to be $x^2+y^2$.

Figure 10:
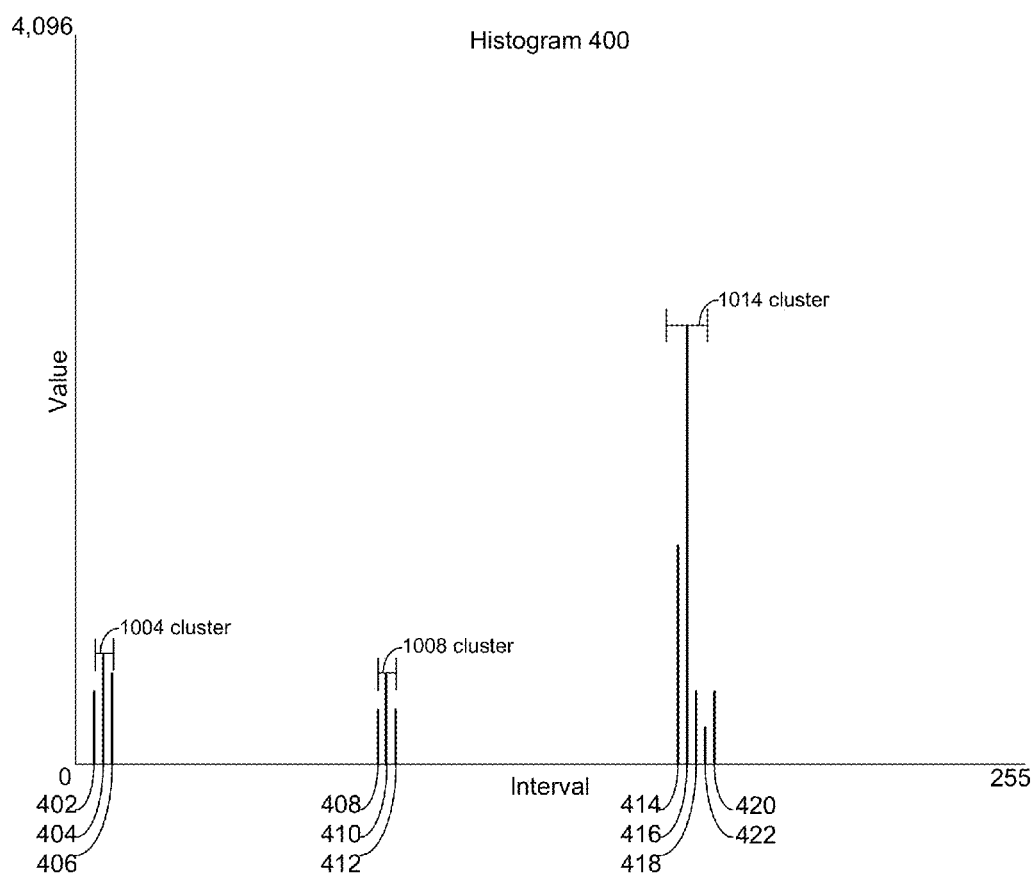
FIG. 10 depicts determining a feature based on an example histogram showing the number of clusters of a color of a tile.

FIG. 10 depicts determining a feature based on an example histogram showing the number of clusters of a color of a tile. Determining a feature as depicted in FIG. 10 may be implemented in process 302 of FIG. 3. A cluster may be considered to be a group of non-zero-valued intervals un-interrupted by a zero-valued interval. In embodiments, there may be a minimum cluster size—e.g. there must be at least X number of contiguous non-zero-valued intervals for that group of intervals to be considered a cluster. As depicted in histogram 400, there are three clusters—cluster 1002, cluster 1008, and cluster 1014.

Figure 11:
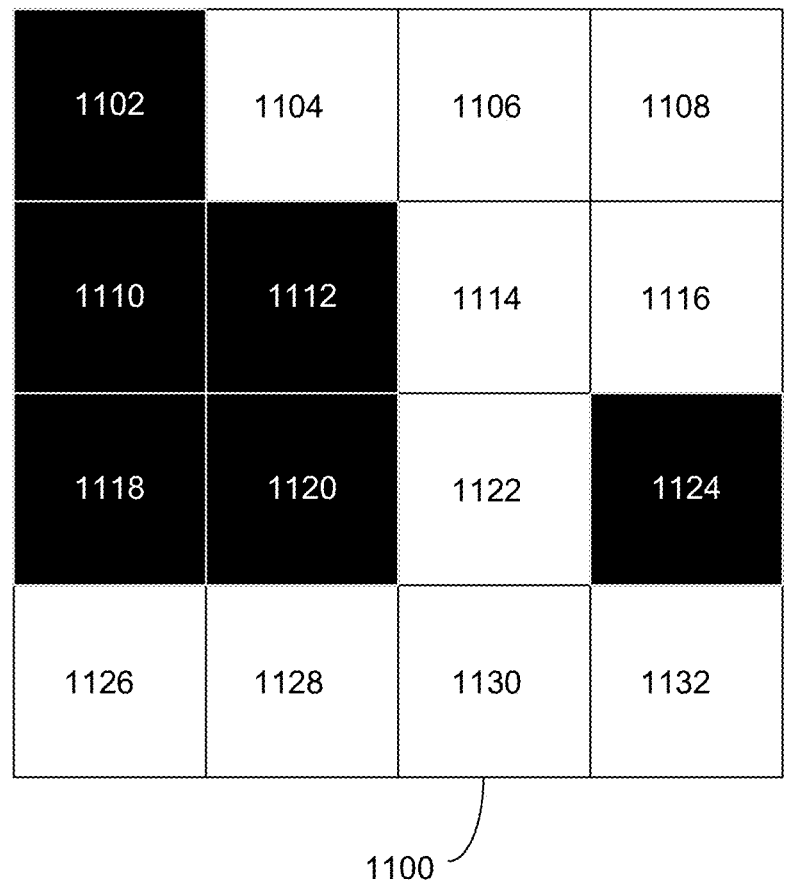
FIG. 11 depicts determining a feature based on the gradient of a tile.

FIG. 11 depicts determining a feature based on the gradient of a tile. Determining a feature as depicted in FIG. 11 may be implemented in process 302 of FIG. 3. Pixels 1102-1132 make up a 4×4 area of pixels of a tile 1100. Each pixel may have a gradient—a measure of a difference in luma or luminance (herein referred to as brightness to refer to either measure) between itself and at least one neighboring pixel (e.g. pixel 1120 has eight neighboring pixels—pixels 1110-1114, 1118, 1122, and 1126-1130). In embodiments, if the gradient of a pixel relative to any of its neighboring pixels is above a threshold, then the pixel may be considered to be on an edge. If the number of edge pixels in a tile is above a threshold, then the tile may be considered to have a feature of being on an edge.

As depicted, let the black pixels—pixels 1102, 1110, 1112, 1118, 1120, and 1124—have a brightness of zero. Additionally, let the white pixels—pixels 1104-1108, 1114-1116, 1122, and 11126-1132—have a brightness of one. Where the threshold for gradient is below 1, then all pixels save for pixel 1108 may be considered to be edge pixels. That is because, for each pixel save for pixel 1108, at least one of the pixel's eight neighbors (or fewer where the pixel is on the edge of the image) is a different color. For instance, pixel 1110 is black and touches pixel 1104, which is white. Only pixel 1108 has all neighbors of the same color. That is, pixel 1108 is white, and its three neighbors—pixels 1106, 1114, and 1116 are also white. Thus, this image portion may be considered to have 15 edge pixels out of 16 total pixels. Where 15 edge pixels is above a threshold for a 4×4 image portion, then the image portion may be considered to be an edge image portion.

In embodiments, pixels may have different brightnesses or colors than just black or white. Still, the present techniques hold, where brightnesses of pixels may be compared to produce a gradient, and this gradient may be compared to a threshold to determine if the gradient is sufficiently high to consider the pixel an edge pixel.

Figure 12:
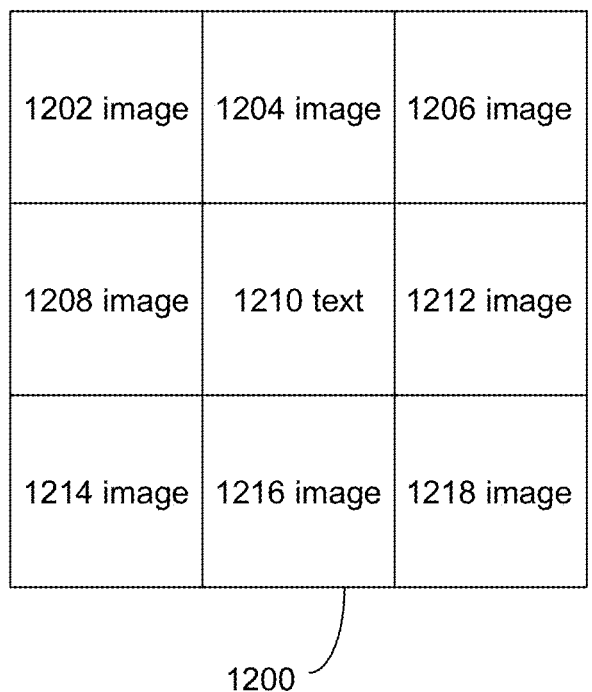
FIG. 12 depicts smoothing the classification of a tile based on the classification of its neighboring tiles within a frame.

FIG. 12 depicts smoothing the classification of a tile based on the classification of its neighboring tiles within a frame. There may be cases where a tile is mis-classified. That is, the true classification of a tile is text, but it has been classified as an image, or vice versa. In embodiments, such cases of mis-classification may be checked by comparing a tile's classification with that of its eight neighboring tiles (fewer, if the tile in question is on the edge of a frame). Where a tile's classification differs from a threshold number of the tile's neighbors, and all (or some) of those neighbors share a classification, that tile's classification may be changed to match that of its neighbors.

Even in instances where a tile is correctly classified, it may be advantageous to re-classify a tile as that of its neighbors, where all of its neighbors share a classification. This is because doing so produces a rectangular region comprising multiple tiles that have one classification, and in embodiments there may be a performance increase in encoding rectangular regions such as this with one encoding scheme.

As depicted, portion of frame 1200 comprises nine tiles—tiles 1202-1218. Tile 1210 is classified as text. However, none of that tile's neighbors—tiles 1202-1208 and 1212-1218—are classified as text; they are classified as images. In such a case where all of the tile's neighbors are of a different classification, it may be said that the number of neighbors with a different classification is above a threshold (the threshold may not require that every neighbor is of a different classification than the tile in question). Where the number of neighbors with a different classification is above this threshold, then the tile in question—tile 1210—may have its classification changed from its current classification (text) to that of its neighbors (image).

The operational procedures depicted in FIGS. 13-18 may be used to develop a solution for classifying tiles, classifying tiles, and encoding classified tiles. It may be appreciated that there are embodiments of the invention that do not implement each operational procedure depicted in a figure, or implement the operational procedures depicted in a different order than is depicted. Furthermore, the operational procedures of FIGS. 13-18 may be implemented upon computer 20 of FIG. 1, or server 201 of FIG. 2.

Figure 13:
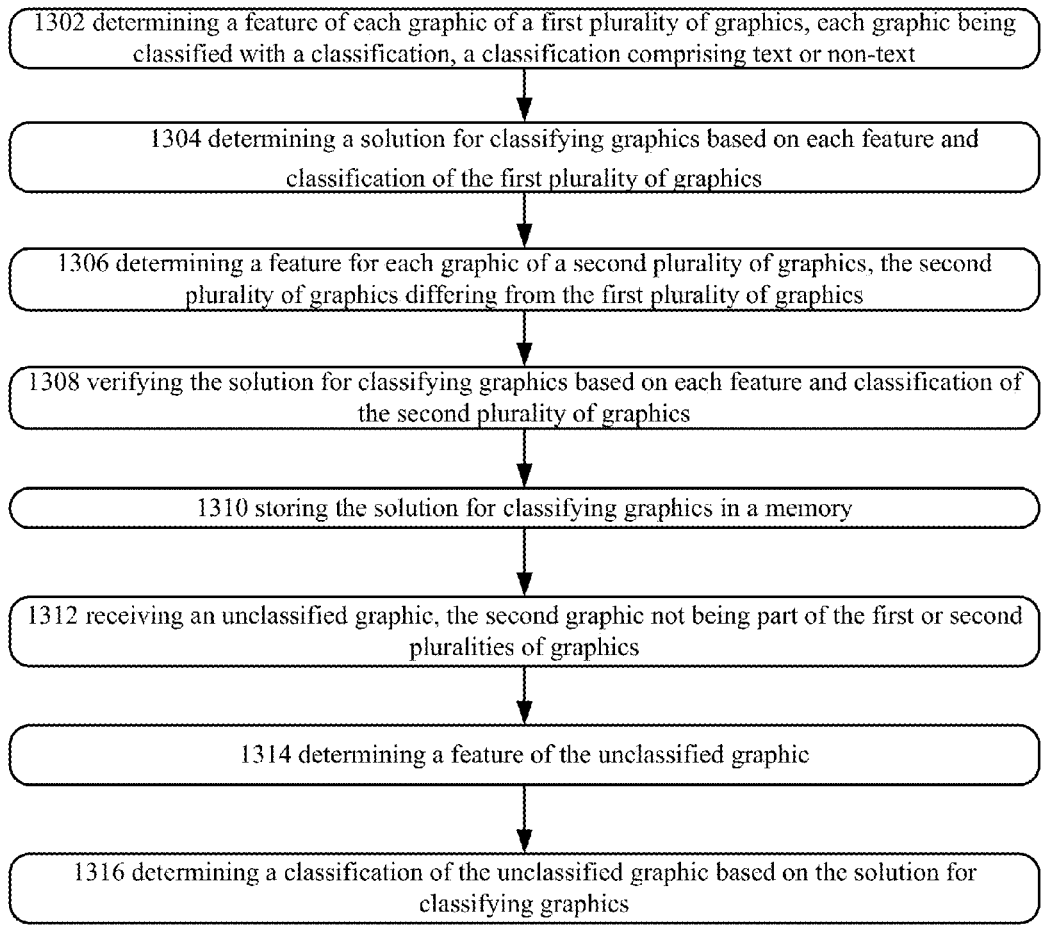
FIG. 13 depicts example operating procedures for determining a solution for classifying tiles.

FIG. 13 depicts example operating procedures for determining a solution for classifying tiles. The operating procedures of FIG. 13 may be used to classify tiles so that they may be encoded based on their classification, thus improving the experience of a remote presentation session.

Operation 1302 depicts determining a feature of each graphic of a first plurality of graphics, each graphic being classified with a classification, a classification comprising text or non-text. The first plurality of graphics may be the training set of graphics, as described previously. Each graphic of this set may be processed to determine a given feature for each graphic, and these features may then be used for classification purposes.

In embodiments, a feature may comprise a number of red, green, or blue peaks of a histogram of a graphic; a number of columns in a red, green, or blue peak of the histogram of a graphic; a number of columns in a red, green, or blue second peak of the histogram of a graphic; a number of columns in a red, green, or blue peak cluster of the histogram of a graphic; a number of peaks in a red, green, or blue square sum of the histogram of a graphic; or a number of red, green, or blue clusters of the histogram of a graphic. These embodiments are described in more detail with respect to FIGS. 3-11. In embodiments, a feature comprises an indication of whether a first threshold is exceeded by a number of pixels of a graphic whose gradient relative to a neighboring pixel is above a second threshold. These embodiments are described in more detail with respect to FIG. 12.

Operation 1304 depicts determining a solution for classifying graphics based on each feature and classification of the first plurality of graphics. In embodiments, operation 1304 comprises providing each feature of the first plurality of graphics as an input set to a machine learning process, and providing each classification to the first plurality of graphics as an output set to the machine learning process, the machine learning process determining the solution based on the input set and the output set. In embodiments, operation 1304 comprises determining a solution for classifying graphics for each graphic based on the feature, such that the solution for classifying graphics determines the classification at least a threshold amount of time.

Operation 1306 depicts determining a feature for each graphic of a second plurality of graphics, the second plurality of graphics differing from the first plurality of graphics. Determining a feature for each graphic of a second plurality of graphics may be performed in a similar manner as described with respect to determining a feature of each graphic of a first plurality of graphics in operation 1302. The second plurality of graphics may comprise the test set of graphics, as described previously. While there may be some overlap between graphics in the first and second plurality of graphics, in sum, these pluralities of graphics differ in not having entirely the same graphics.

Operation 1308 depicts verifying the solution for classifying graphics based on each feature and classification of the second plurality of graphics. This may comprise, for instance, determining that the solution correctly classifies graphics of the second plurality of graphics at least a threshold amount.

Operation 1310 depicts storing the solution for classifying graphics in a memory. Where the solution is implemented as processor-executable instructions, operation 1310 may comprise storing those processor-executable instructions in a computer memory or computer-readable storage medium.

Operation 1312 depicts receiving an unclassified graphic, the second graphic not being part of the first or second pluralities of graphics. After a solution has been devised based on the first and second pluralities of graphics, the solution may be used to classify unclassified graphics. Here, an unclassified graphic is passed as input to the solution, produces a classification for the graphic as output.

Operation 1314 depicts determining a feature of the unclassified graphic. Operation 1314 may be performed in a similar manner as determining a feature is described with respect to operation 1302. The unclassified graphic may be a graphic that is not a member of either the first or second pluralities of graphics. If it is a part of one of those pluralities of graphics in that a duplicate of it is in one of those pluralities, the unclassified graphic may be distinguished because there is not a classification known for it.

Operation 1316 depicts determining a classification of the unclassified graphic based on the solution for classifying graphics. In embodiments, operation 1316 comprises determining the classification of the unclassified graphic based on the feature, such as that which is classified in operation 1314.

Figure 14:
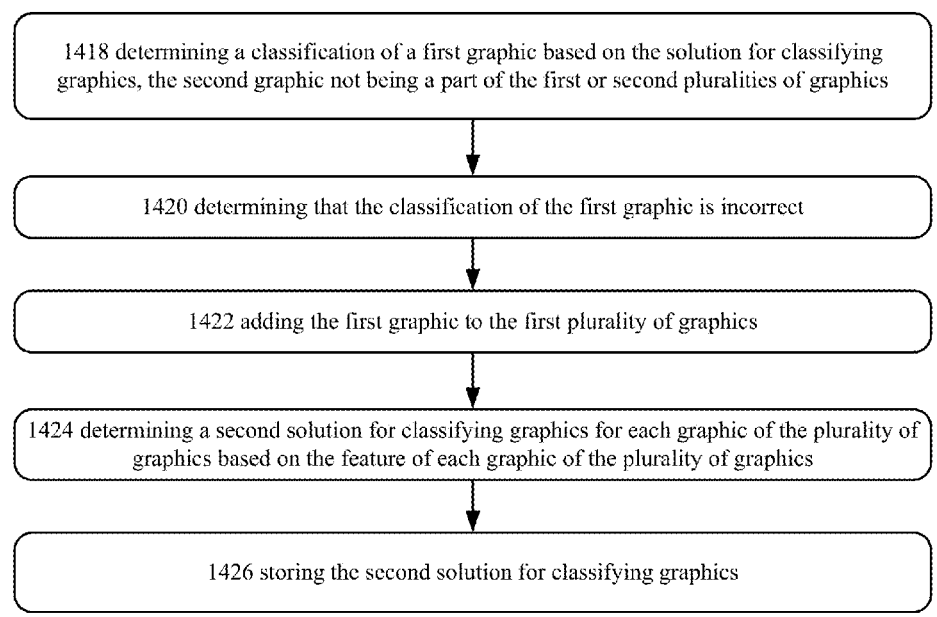
FIG. 14 depicts example operating procedures for refining a solution for classifying tiles.

FIG. 14 depicts example operating procedures for refining a solution for classifying tiles. In embodiments, the solution (such as the solution determined in FIG. 13) may not correctly classify every graphic that it processes it. Rather, it may be that the solution has been shown to correctly classify graphics at least a threshold amount of the time. Where, after determining and verifying the solution based on the first and second pluralities of graphics, there are graphics that the solution incorrectly classifies, these graphics may be incorporated into the first plurality of graphics, and an improved solution (the second solution) may be determined.

Operation 1418 depicts determining a classification of a first graphic based on the solution for classifying graphics, the first graphic not being a part of the first or second pluralities of graphics. After the solution has been determined, the solution may be used to classify unclassified graphics, such as the first graphic.

Operation 1420 depicts determining that the classification of the first graphic is incorrect. As described previously, a solution may not correctly classify every graphic that it classifies, but rather, a threshold amount of graphics of the first and/or second pluralities of graphics. Where a graphic has been incorrectly classified, a computer implementing the operations of FIG. 14 may receive an indication of such, such as via user input.

Operation 1422 depicts adding the first graphic to the first plurality of graphics. Where the first graphic has been identified as being incorrectly classified it may be added to the first or second plurality of graphics, and the operations of determining a solution may be performed again, using this modified plurality of graphics, so as to determine a different solution that is likely to be more accurate than the original solution.

Operation 1424 depicts determining a second solution for classifying graphics for each graphic of the plurality of graphics based on the feature of each graphic of the plurality of graphics. Determining the second solution may be performed in a similar manner as determining the solution is performed as described with respect to operation 1304.

Operation 1426 depicts storing the second solution for classifying graphics. Where the second solution is implemented as processor-executable instructions, operation 1426 may comprise storing those processor-executable instructions in a computer memory or computer-readable storage medium.

Figure 15:
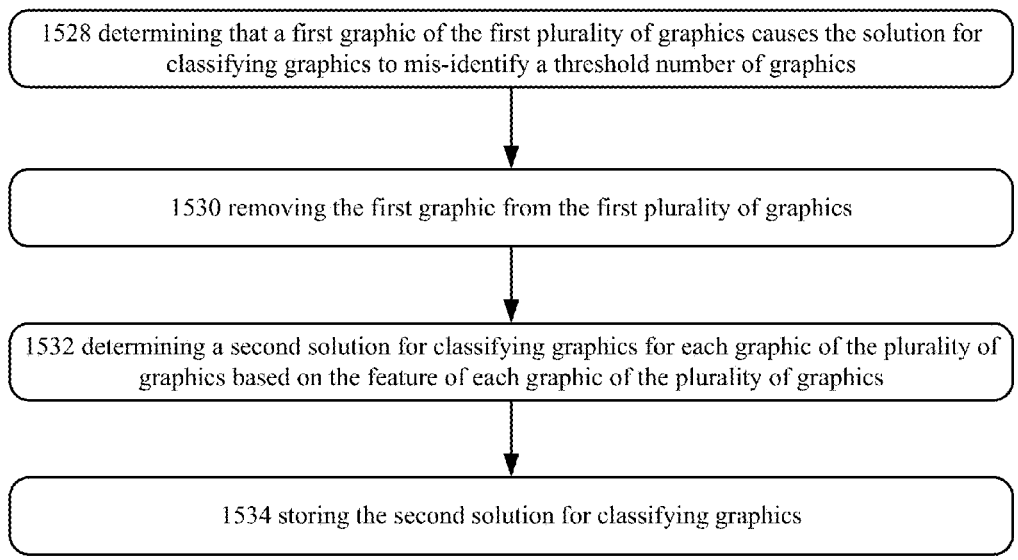
FIG. 15 depicts example operating procedures for another embodiment of refining a solution for classifying tiles.

FIG. 15 depicts example operating procedures for another embodiment of refining a solution for classifying tiles. FIG. 14 depicts refining a solution for classifying tiles where it is determined that a tile not used to develop or verify the solution is being incorrectly classified. In contrast, FIG. 15 depicts refining a solution where it is determined that a tile among the tiles used to develop or verify the solution causes the solution to correctly identify fewer tiles than it would otherwise identify. For instance, a particular graphic may be a rare "edge" case, and while using that graphic to determine the solution may help classify those rare cases, it may cause the solution to incorrectly classify graphics that are more commonly found.

Operation 1528 depicts determining that a first graphic of the first plurality of graphics causes the solution for classifying graphics to mis-identify a threshold number of graphics. This threshold may comprise a percentage of the number of graphics that are classified by the solution.

Operation 1530 depicts removing the first graphic from the first plurality of graphics. This operation may comprise, for instance, removing a reference to the first graphic from a list or index of graphics that identifies the first plurality of graphics.

Operation 1532 depicts determining a second solution for classifying graphics for each graphic of the plurality of graphics based on the feature of each graphic of the plurality of graphics. In embodiments, operation 1532 may be implemented in a similar fashion as operation 1304 is implemented.

Operation 1534 depicts storing the second solution for classifying graphics. Where the second solution is implemented as processor-executable instructions, operation 1534 may comprise storing those processor-executable instructions in a computer memory or computer-readable storage medium.

Figure 16:
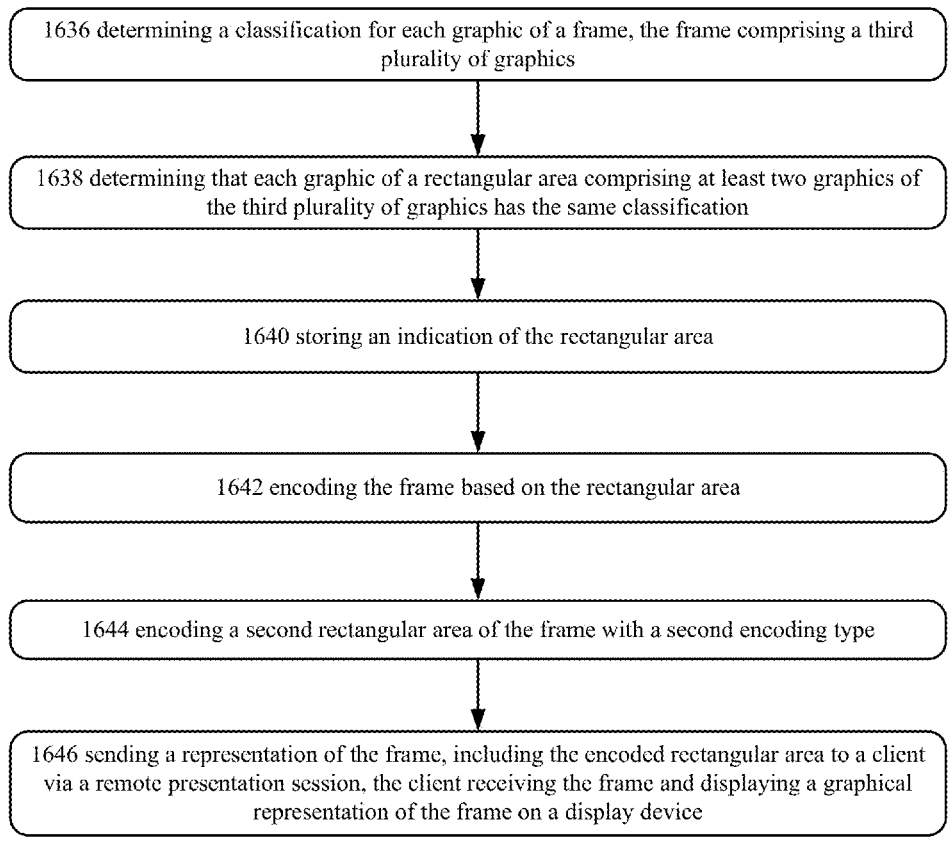
FIG. 16 depicts example operating procedures for encoding a frame of classified tiles.

FIG. 16 depicts example operating procedures for encoding a frame of classified tiles. In embodiments where tiles of a frame are classified in the course of a remote presentation session server sending graphical data to a client, the classification of the tiles may be used to encode the tiles/frame for transmission in the remote presentation session.

Operation 1636 depicts determining a classification for each graphic of a frame, the frame comprising a third plurality of graphics. Determining a classification for each graphic of the frame may be performed by processing each graphic with the solution, such as described with respect to operation 1418 of FIG. 14.

Operation 1638 depicts determining that each graphic of a rectangular area comprising at least two graphics of the third plurality of graphics has the same classification. Determining such a rectangular area may be performed by comparing the classification of a rectangle against that of its adjoining neighbors. Such operations may be performed in iterations of the graphics of a frame to expand or "grow" a rectangle to a larger area than two graphics.

Operation 1640 depicts storing an indication of the rectangular area. This may comprise, for instance, storing an indication of the location of two diagonally-opposed edges of the rectangular area in a computer memory.

Operation 1642 depicts encoding the frame based on the rectangular area. In embodiments, there may be performance benefits to encoding areas larger than a single graphic with one encoding scheme, or in one process, rather than encoding the individual graphics separately. For instance, it may be that where the graphics of the rectangle are all classified as solid fill and have the same color, they may all be encoded by making one reference to the color, and to the dimensions of the rectangle. This may result in a compression improvement relative to making reference to the color for each individual graphic of the rectangle.

Operation 1644 depicts encoding a second rectangular area of the frame with a second encoding type. This may be performed, for instance, where encoding the frame based on the rectangular area in operation 1642 comprises the rectangular area with a first encoding type. That is, the graphics and rectangles within a frame may be encoded differently based on their classification. For instance, in embodiments, solid fill may be encoded as described with respect to operation 1642, whereas text may be encoded by caching individual characters or glyphs (or sub-glyphs), and identifying repeats of those glyphs, etc., by referring back to the cached glyph, rather than by storing that glyph a second time.

Operation 1646 depicts sending a representation of the frame, including the encoded rectangular area to a client via a remote presentation session, the client receiving the frame and displaying a graphical representation of the frame on a display device. In embodiments where the operations of FIG. 16 occur as part of a remote presentation session, a remote presentation session server (such as server 201 of FIG. 2) may send a representation of the frame (e.g. tiles of the frame that a client does not already have cached, or a lossy-compressed representation of the frame) to a client (such as client 204 of FIG. 2), where the client receives this representation and displays it on a display device, such as a computer monitor.

Figure 17:
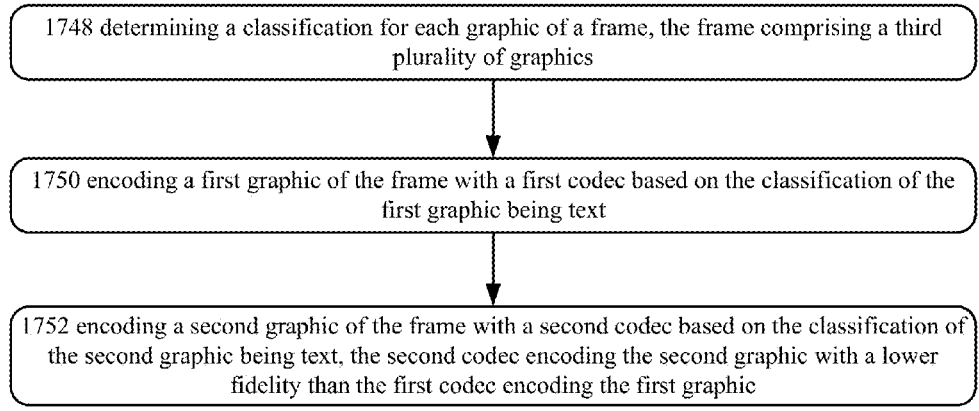
FIG. 17 depicts more example operating procedures for encoding a frame of classified tiles.

FIG. 17 depicts more example operating procedures for encoding a frame of classified tiles. The operating procedures of FIG. 17 may be used in embodiments where multiple rectangles of graphics within a frame are identified and not all of these rectangles are encoded with the same encoding technique.

Operation 1748 depicts determining a classification for each graphic of a frame, the frame comprising a third plurality of graphics. Determining a classification for each graphic of the frame may be performed by processing each graphic with the solution, such as described with respect to operation 1418 of FIG. 14.

Operation 1750 depicts encoding a first graphic of the frame with a first codec based on the classification of the first graphic being text. Operation 1750 may be effectuated in a similar manner to the way that text may be encoded with a first coded, such as described with respect to Operation 1644 of FIG. 16.

Operation 1752 depicts encoding a second graphic of the frame with a second codec based on the classification of the second graphic being text, the second codec encoding the second graphic with a lower fidelity than the first codec encoding the first graphic. Commonly, humans are able to perceive encoding artifacts in text better than they are able to perceive compression artifacts in non-text. Additionally, it is common that progressive encoding schemes as applied to text lack the benefit of progressive encoding schemes as applied to non-text, because the text is often illegible until it is nearly fully displayed, anyway. As depicted in operation 1752, the text and non-text graphics are encoded with different encoding schemes, and the text is encoded at a higher fidelity than the non-text.

Figure 18:
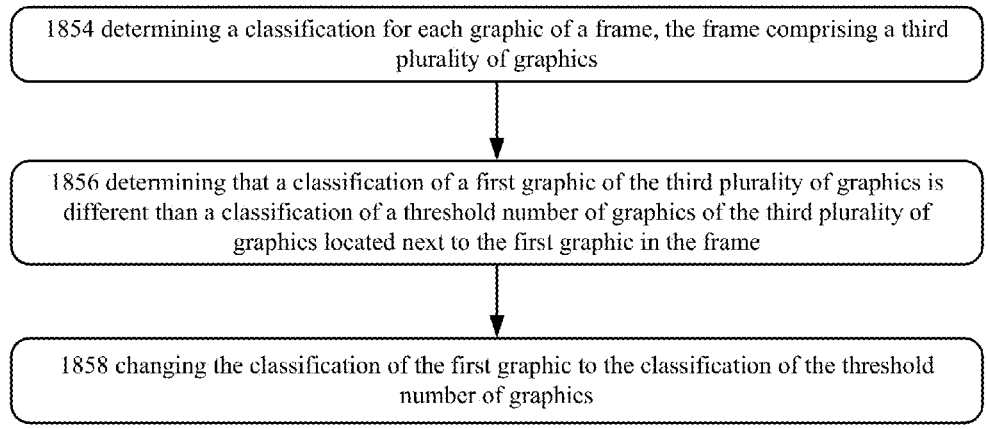
FIG. 18 depicts example operating procedures for re-classifying a tile of a frame of classified tiles.

FIG. 18 depicts example operating procedures for re-classifying a tile of a frame of classified tiles. As discussed previously, it may be that the solution (or the second solution) mis-classifies some tiles. One way this may be identified is where a threshold amount of a tile's neighbors in a frame are of a different classification, and of the same classification. Furthermore, even where a tile has been correctly classified, it may be preferable to encode it as if it were a different classification, for the reasons discussed above with respect to FIG. 16 and encoding rectangles.

Operation 1854 depicts determining a classification for each graphic of a frame, the frame comprising a third plurality of graphics. This may be performed in a similar manner as described with respect to operation 1304 of FIG. 13.

Operation 1856 depicts determining that a classification of a first graphic of the third plurality of graphics is different than a classification of a threshold number of graphics of the third plurality of graphics located next to the first graphic in the frame. This may be performed by comparing the classification of a graphic against that of its neighbors. Where graphics are rectangular, those graphics that are not on the edge of a frame may have eight neighbors (above, upper-left, left, below-left, below, below-right, right, and above-right). Where a threshold number of these neighbors—e.g. five of the eight—are all of the same classification—e.g. text—and that classification differs from the classification of the graphic—e.g. non-text, operation 1856 may be satisfied.

Operation 1858 depicts changing the classification of the first graphic to the classification of the threshold number of graphics. For instance, as described with respect to operation 1856, the threshold number of neighbors may be classified as text, and the graphic in question may be classified as non-text. In such a scenario, in operation 1858, the classification of the first graphic may be changed from non-text to text.

While the present invention has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. The invention may be implemented with computer-readable storage media and/or computer-readable communication media. Thus, the invention, or certain aspects or portions thereof, may take the form of program code (i.e., instructions) embodied in tangible media, such as floppy diskettes, CD-ROMs, hard drives, or any other machine-readable storage medium. Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for classifying tiles to be sent to a computer in a remote presentation session, a tile comprising a plurality of pixels, comprising:

retrieving from storage a stored machine learning classifier, the stored machine learning classifier having been trained via a training process on a training set of pre-classified tiles, each pre-classified tile of the training set of pre-classified tiles having a feature comprising a numerical value that represents a characteristic of a plurality of pixels of a first pre-classified tile of the training set of pre-classified tiles, the training process comprising using machine learning to determine a function for classifying a set of unclassified tiles based on a correspondence between the feature and a pre-determined classification of the first pre-classified, the training process comprising verifying that providing a feature of a second pre-classified tile of the training set of pre-classified tiles to the stored machine learning classifier causes the stored machine learning classifier to output a pre-determined classification of the second pre-classified tile;

using the stored machine learning classifier on a first unclassified graphics tile of a set of unclassified graphics tile to determine classification of the first unclassified graphics tile, and to produce a first classified graphics tile;

encoding the first classified graphics tile using a codec selected according to the determination of the machine learning classifier; and sending the encoded first classified graphics tile to the remote device.

2. The method of claim 1, wherein the pre-determined classification of the first pre-classified tile comprises:

a text, an image, a solid fill, a natural image, a synthetic image, a natural image, a graphic suitable for a first compressor, or a graphic suitable for a second compressor.

3. The method of claim 1, further comprising:

determining a feature of the first unclassified graphics tile before determining a classification of the first unclassified graphics tile; and determining the classification of the first unclassified graphics tile based on the feature.

4. The method of claim 1, further comprising:

determining a classification for each unclassified graphics tile of a frame, the frame comprising a second set of unclassified graphics tiles;

determining that each unclassified graphics tile of a rectangular area has the same classification, the rectangular area comprising at least two unclassified graphics tiles of the frame; and encoding the rectangular area using a codec selected according to the classification of each unclassified graphics tile of the rectangular area.

5. The method of claim 4, further comprising:

encoding the frame based on the rectangular area.

6. The method of claim 5, wherein encoding the frame based on the rectangular area comprises encoding the rectangular area with a first encoding type, and further comprising:

encoding a second rectangular area of the frame with a second encoding type.

7. The method of claim 5, further comprising:

sending a representation of the encoded frame, including the rectangular area, to the remote device via the remote presentation session, the remote device receiving the encoded frame and displaying a graphical representation of the encoded frame on a display device.

8. The method of claim 1, further comprising:

determining a classification for each unclassified graphics tile of a frame, the frame comprising a set of unclassified graphics tiles;

determining that a classification of a first graphics tile of the frame is different than a classification of a threshold number of unclassified graphics tiles of the frame located next to the first graphics tile in the frame; and changing the classification of the first graphics tile of the frame to the classification of the threshold number of graphics.

9. The method of claim 1, wherein using machine learning to determine the function for classifying the set of unclassified tiles further comprises:

determining that the function determines the classification at least a threshold amount of time.

10. The method of claim 1, further comprising:

determining a classification for each unclassified graphics tile of a frame, the frame comprising a second set of unclassified graphics tiles;

encoding a first graphics tile of the frame with a first codec based on determining that a classification of the first graphics tile is text; and encoding a second graphics tile of the frame with a second codec based on determining that a classification of the second graphics tile is non-text, the second codec encoding the second graphics tile with a lower fidelity than the first codec encoding the first graphics tile.

11. A virtualization device for producing a remote presentation session on a remote device, the virtualization device comprising:

a processor; and a memory communicatively coupled to the processor when the virtual device is operational, the memory bearing processor-executable instructions that, upon execution by the processor, cause the virtual device at least to:

retrieve from storage on the virtualization device a stored machine learning classifier, the stored machine learning classifier having been trained via a training process on a training set of pre-classified tiles, each pre-classified tile of the training set of pre-classified tiles having a feature comprising a numerical value that represents a characteristic of a plurality of pixels of a first pre-classified tile of the training set of pre-classified tiles, the training process comprising using machine learning to determine a function for classifying a set of unclassified tiles based on a correspondence between the feature and a pre-determined classification of a first pre-classified tile of the training set of pre-classified tiles, the training process comprising verifying that providing a feature of a second pre-classified tile of the training set of pre-classified tiles to the stored machine learning classifier causes the stored machine learning classifier to output a pre-determined classification of the second pre-classified tile;

use the stored machine learning classifier on a first unclassified graphics tile of a set of unclassified graphics tiles to determine classification of the unclassified graphics tile, and to produce a first classified graphics tile;

encode the first classified graphics tile using a codec selected according to the determined classification; and send the encoded first classified graphics tile to the remote device.

12. The virtualization device of claim 11, wherein the memory further bears processor-executable instructions that, upon execution by the processor, cause the virtualization device at least to:

determine an identifier that may be used to encode a second graphics tile based on the function, the second graphics tile being separate from the training set of pre-classified tiles or the set of unclassified graphics tiles;

determine that the identifier that may be used to encode the second graphics tile is incorrect;

add the second graphics tile to the set of unclassified graphics tiles;

determine a second function for the set of unclassified graphics tiles based on a value of each tile of the set of unclassified graphics tiles; and store the second function.

13. The virtualization device of claim 11, wherein the memory further bears processor-executable instructions that, upon execution by the processor, cause the virtualization device at least to:

determine that a third graphics tile of the set of unclassified graphics tiles causes the function to mis-identify a threshold number of graphics tiles;

remove the third graphics tile of from the set of unclassified graphics tiles;

determine a second function for the set of unclassified graphics tiles based on a value of each tile of the set of second unclassified graphics tiles; and store the second function.

14. The virtualization device of claim 11, wherein a value comprises:

a number of red, green, blue, or luma peaks of a histogram of a graphic.

15. The virtualization device of claim 11, wherein a value comprises:

a number of columns in a red, green, or blue peak of a histogram of a graphic;

a number of columns in a red, green, or blue second peak of the histogram of a graphic; or a number of columns in a red, green, or blue peak cluster of the histogram of a graphic.

16. The virtualization device of claim 11, wherein a value comprises:

a number of peaks in a red, green, or blue square sum of a histogram of a graphic; or a number of red, green, or blue clusters of the histogram of a graphic.

17. The virtualization device of claim 11, wherein a value comprises:
an indication of whether a first threshold is exceeded by a number of pixels of a graphic whose gradient relative to a neighboring pixel is above a second threshold.

18. The virtualization device of claim 11, wherein an identifier that may be used to encode the first unclassified graphics tile comprises:
a text, an image, a solid fill, a natural image, a synthetic image, a graphic suitable for a first compressor, or a graphic suitable for a second compressor.

19. A computer-readable storage device bearing computer-readable instructions that, when executed upon a computer, cause the computer to perform operations comprising:
retrieving from storage a stored machine learning classifier, the stored machine learning classifier having been trained via a training process on a training set of pre-classified tiles,
each pre-classified tile of the training set of pre-classified tiles having a feature comprising a numerical value that represents a characteristic of a plurality of pixels of a first pre-classified tile of the training set of pre-classified tiles,
the training process comprising using machine learning to determine a function for classifying a set of unclassified tiles based on a correspondence between the feature and a pre-determined classification of the first pre-classified tile,
the training process comprising verifying that providing a feature of a second pre-classified tile of the training set of pre-classified tiles to the stored machine learning classifier causes the stored machine learning classifier to output a pre-determined classification of the second pre-classified tile;
using the stored machine learning classifier on a first unclassified graphics tile of a set of unclassified graphics tile to determine classification of the first unclassified graphics tile, and to produce a first classified graphics tile;
encoding the first classified graphics tile using a codec selected according to the determination of the machine learning classifier; and
sending the encoded first classified graphics tile to the remote device.

20. The computer-readable storage device of claim 19, further bearing computer-readable instructions that, when executed upon the computer, cause the computer to perform operations comprising:
determining a classification for each unclassified graphics tile of a frame, the frame comprising a second set of unclassified graphics tiles;
determining that each unclassified graphics tile of a rectangular area has the same classification, the rectangular area comprising at least two unclassified graphics tiles of the frame; and
encoding the rectangular area using a codec selected according to the classification of each unclassified graphics tile of the rectangular area.

* * * * *